United States Patent [19]

Lang et al.

[11] 4,269,754

[45] May 26, 1981

[54] PHENOLIC RESIN PARTICLES AND PROCESSES FOR THEIR PRODUCTION AND FRICTION ELEMENTS CONTAINING SAME

[75] Inventors: Edward J. Lang, Grand Island; Michael G. Dubenitz, Williamsville, both of N.Y.

[73] Assignee: Hooker Chemicals & Plastics Corp., Niagara Falls, N.Y.

[21] Appl. No.: 58,899

[22] Filed: Jul. 19, 1979

[51] Int. Cl.$^3$ .................................................. C08K 5/01
[52] U.S. Cl. .............................. 260/33.6 R; 260/38; 260/998.13; 525/480
[58] Field of Search ...................... 260/33.6 R, 998.13, 260/38, DIG. 39; 528/503; 525/480

[56] References Cited

U.S. PATENT DOCUMENTS

| | | | |
|---|---|---|---|
| 3,501,552 | 3/1970 | Robins | 260/33.6 R |
| 3,873,490 | 3/1975 | Grazen et al. | 260/38 |
| 3,895,826 | 7/1975 | Gunning et al. | 260/33.6 R |
| 4,014,828 | 3/1977 | Thorpe | 260/38 |

*Primary Examiner*—Lewis T. Jacobs
*Attorney, Agent, or Firm*—Peter F. Casella; James F. Mudd; David A. Stein

[57] ABSTRACT

Phenolic resin particles which are useful as friction particles for use in friction elements such as brake linings, clutch facings or other braking devices are produced by dispersing a liquid, heat curable phenolic resin in a paraffinic oil having a viscosity of at least about 1,000 SUS at 100° F. at a temperature of about 100° to about 175° C. Preferred friction particles are prepared from phenolic resins containing benzylic ether linkages in the presence of hot oil or by other heating methods. Friction elements containing such particles are also described.

19 Claims, No Drawings

PHENOLIC RESIN PARTICLES AND PROCESSES FOR THEIR PRODUCTION AND FRICTION ELEMENTS CONTAINING SAME

BACKGROUND OF THE INVENTION

This invention relates to a process for preparing substantially spherical particles of a cross-linked phenolic resin in a size range suitable for use as a friction particle. The resulting friction particle and friction elements containing such particles are described herein.

As used herein "friction particle" is intended to mean a particulate material having the properties of no substantial softening at elevated temperatures and a material which will not flow together or cohere with other particles, as would be the case with a "friction binder". A "friction particle" will not fuse with like friction particles, and is insoluble. A friction particle is held in place with a friction binder.

As used herein, a "friction binder" has the properties of flowability and adhesive and cohesive binding action, for the purpose of binding together the asbestos and other additives (including a friction particle) necessary for building a brake lining or other similar article of manufacture.

As used herein, "friction element" is a composition useful as linings or facings in brakes, main clutches, and banded clutch facings of power transmission speed control structures of power driven devices such as automotive vehicles. Friction elements as now made are composed in general of the filamentous reinforcing friction material, bonded with a friction binder and containing other organic or mineral friction controlling agents such as friction particles.

THE PRIOR ART

Phenolic resins have been used for the production of friction particles such as in U.S. Pat. No. 3,873,490. The patentees describe friction particles made by curing various mixtures of two or more phenolic resins. The particles are produced by blending and reacting of the components by heating them to an elevated temperature until a resin of friction particle consistency is formed.

U.S. Pat. No. 4,014,828 describes the preparation of friction particles from polyesters and from cashew nut shell oil resin by a curing process that is conducted in a liquid medium such as water, glycols and alcohols. The patentees disclose that higher boiling liquids can be used if the crosslinking temperature is greater than 100° C.

The object of the present invention is to provide an improved process for making friction particles over the processes heretofor disclosed. Another object is to provide novel friction particles and friction elements containing such particles.

SUMMARY OF THE INVENTION

Friction particles for use in friction elements such as brake linings, clutch facings and other braking devices are produced by a process comprising dispersing a liquid, heat curable phenolic resin in a paraffinic oil having a viscosity of at least about 1,000 SUS at 100° F. at a temperature of about 100° to about 175° C. In the course of the process of the invention the liquid resin is dispersed as droplets in a suitable oil bath and the resin cures to a solid hard particle at the elevated temperature of the oil bath.

In the process of the invention, the friction particles can be removed from the hot oil by filtration or centrifuging to separate the particles from the oil medium. The particles may be subsequently washed with suitable liquids to remove the oil from the particles prior to their use in the manufacture of friction elements.

The resulting friction particles are suitable for incorporation in friction elements in which they are bonded together with a friction binder and contain other organic or mineral friction controlling agents which impart specific properties and characteristics to such friction elements, for example, heat resistance, resistance to moisture sensitivity, wear and noise.

Further in accordance with the invention, there are provided novel friction particles comprising the product of the reaction of a phenolic resin containing benzylic ether linkages. Such friction particles are produced by heating a phenolic resin containing benzylic ether linkages at an elevated temperature and preferably by conducting the heating of the phenolic resin in a hot oil bath in accordance with the above-described process of the invention.

The invention also provides novel friction elements useful in brake linings, clutch facings and the like, comprising the friction particles of the invention and a binder composition. The binder composition may comprise a resin binder and a filler material.

PREFERRED EMBODIMENTS OF THE INVENTION

The Phenolic Resins

In one aspect of the invention, friction particles are produced by dispersing in an oil at an elevated temperature a phenolic resin that is in the liquid stage. Suitable phenolic resins include that class of phenol-aldehyde resins known as resole resins. Phenolic resole resins are generally prepared by reacting a phenol with an excess molar proportion of an aldehyde in the presence of an alkaline catalyst.

Examples of phenols which can be used in preparing a phenol aldehyde resole for use in practicing the invention include ortho-, para- directing hydroxy or amino aromatic compounds having 6 to 24 carbon atoms such as phenol itself ($C_6H_5OH$), naphthol, anthranol and substituted derivatives thereof where the substituents on the aromatic compound are independently selected from hydrogen, halogen such as Cl, Br, and F, $NH_2$ and hydrocarbon radicals such as:

a. alkyl groups or radicals of 1 to 60 carbon atoms, preferably of 1 to 30 carbon atoms, and their various isomeric forms and substituted on the aromatic nucleus in the ortho or para position;

b. cycloalkyl groups of 5 to 12 carbon atoms such as cyclohexyl, cyclopentyl, methylcyclohexyl, butylcyclohexyl, and so forth;

c. alkyl, aryl and cycloalkyl ketonic groups wherein the hydrocarbon portion is as defined above in (a) and (b);

d. alkyl, aryl and cycloalkyl carboxylic groups wherein the hydrocarbon part is defined as above in (a) and (b);

e. aryl groups of 6 to 24 carbon atoms such as phenyl, naphthyl, anthryl, and the like;

f. aryl substituted alkyl wherein the aryl is phenyl which may contain lower alkyl and/or hydroxy substituents so that the resulting hydroxy aromatic is, for example, a bisphenol;

g. the corresponding oxyhydrocarbon radicals; and
h. mixtures of the aforesaid hydroxy aromatics.

Suitable substituted phenols include meta-methyl phenol, m-propyl phenol, m-isobutyl phenol, m-sec-butyl phenol, m-tert-butyl phenol, m-bromo phenol, m-chloro phenol, m-phenyl phenol, m-benzyl phenol, m-cetyl phenol, m-cumyl phenol, m-hydroxyacetophenone, m-hydroxybenzophenone, m-d-limonene phenol. The corresponding phenols substituted in the para-position can be used but are not preferred. Ortho-substituted phenols are generally not employed.

Mixtures of various hydroxy aromatic compounds mentioned herein also may be used.

Included among the phenolic reactants which may be used are those known as the "cresylic acids" and these often comprise heterogeneous mixture of having two reacting hydrogen positions on each of them; that is, compounds unsubstituted in the ortho- and para-positions of the molecule, to compounds that only have one functional position, and hence, relatively unreactive. These compounds may include the following: 3,5-xylenol, m-cresol, 3,4-xylenol, 2,5-xylenol, 2,3-xylenol, phenol, p-cresol, orthocresol, 2,4-xylenol, and 2,6-xylenol. Cresylic acids or tar acids are generally applied to phenol and its homologs which may include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydric hydrogenation products, and the like.

Polyhydroxy aromatic reactants, such as resorcinol, may also be used.

Also useful in this invention are mixtures of aniline and phenol to react with an aldehyde or ketone to produce either a novolac or a resole, depending on the other conditions described above.

Also useful in the invention are mixtures of urea and phenol to react with the aldehyde or ketone to produce either a novolac or a resole depending on the other conditions described above.

Among the aldehydes which may be used within the scope of this invention to produce either the resole are formaldehyde or any of its variations, such as 37 percent or higher concentrations of formalin, or paraldehyde, acetaldehyde, propionaldehyde, isobutyraldehyde, isopentaldehyde, and the like. The aldehyde should have not more than 8 carbon atoms and should not detrimentally affect the resinification of the resin. Preferred aldehydes are those having from 1 to 4 carbon atoms, such as formaldehyde, which may be in aqueous solution (37 percent or higher), or in any of its low polymeric forms such as paraform or trioxane. Other aldehydes include para-aldehydes, furfural, 2-ethyl-hexanal, ethylbutyraldehyde, heptaldehyde and glyoxal, benzaldehyde and crotonaldehyde.

The liquid one-stage resin (resole) which forms a part of this invention may be formed by reacting a hydroxy aromatic compound with at least one and up to three moles of aldehyde per mole of hydroxy aromatic compound in alkali such as sodium hydroxide dissolved in water. The reaction mixture is gradually heated to reflux and held at reflux until less than about 1 percent of free formaldehyde remains. This provides a preferred reaction product which has less than 2 percent of the formaldehyde unreacted, although this is not critical in this process. Less than 2 percent free $CH_2O$ is desirable. The reaction mixture is then cooled and the catalyst neutralized with some acid such as glacial acetic acids and the pH is adjusted to roughly 6 to 7.5. The reaction mixture may be then further reacted with hexamethylene tetramine or some other aldehyde donor, i.e., curing agent. The resin is then dehydrated to between about 50 to 95 percent solids, and preferably between about 81 to 85 percent solids.

The alkaline catalyst used in preparing the resoles to be used in this invention may be any of those known in the art; for instance, sodium hydroxide and calcium hydroxide. In general, the alkali metal hydroxides and the alkaline earth metal hydroxides and ammonium hydroxide and the amines such as triethanol amines may be used.

Following the intercondensation reaction to form a resole, a stoichiometric quantity of a strong acid such as sulfuric acid, hydrochloric acid, phosphoric acid or oxalic acid, or the like, is added to the reaction mixture in order to neutralize the alkaline condensation catalyst. Sulfuric acid is conveniently employed to neutralize a sodium hydroxide catalyst. The alkaline catalyst may also be neutralized by dilution through repeated washing, however, it is preferred to use an acid. The final resin should have a pH between about 5.5 and 7.5 for good stability.

The hydroxy aromatic compound employed in a resole can be alkylated, if desired, with alkyl groups containing 1 to 12 carbon atoms, or with unsaturated groups, including the long-chain unsaturated vegetable or animal oils, to form alkylated hydroxy aromatic compounds that when reacted with an aldehyde form "heat reactive" resoles. These include alkylene groups of 2 to 36 carbom atoms, fatty acids, polyethers, alkyl ethers, polyesters and polyols and mixtures of these.

Suitable resole resins for use in the invention are disclosed in U.S. Pat. No. 3,873,490, the disclosure of which is incorporated herein by reference.

The preferred phenolic resins for use in manufacturing the friction particle of the invention are those phenolic resins having benzylic ether linkages. Such resins include a component having the structure

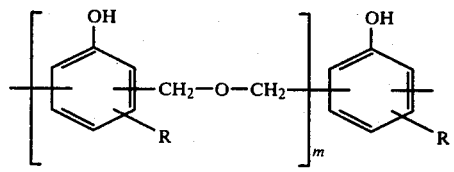

where m is an integer, and R is hydrogen, a hydrocarbon radical, oxyhydrocarbon radical or halogen, meta to be hydroxyl group of the phenyl group. Such resins are disclosed in U.S. Pat. No. 3,485,797, the disclosure of which is incorporated herein by reference. As disclosed in this patent, the benzyl ether resins disclosed in this patent contain a principle component which has the general formula

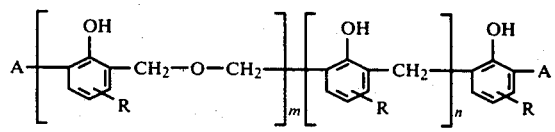

wherein R is hydrogen, a hydrocarbon radical, oxyhydrocarbon radical or halogen, meta to the hydroxyl group of the phenyl group; m and n are numbers the sum of which is at least two and the ratio of m-to-n is at least one; and A is hydrogen, a methylol group or —CH$_2$(OCH$_2$)$_x$OH, where x is an integer, preferably from 1 to 4. The molar ratio of the other groups to hydrogen is preferably at least one.

Generally such phenolic resin compositions comprise a mixture also containing dimethylol compounds such as dimethylol phenol, dimethylol bisphenol and a dimethylol bisphenol wherein the phenyl rings are joined by a —CH$_2$—O—CH$_2$—group. Such phenolic resins containing benzylic ether linkages are prepared by reacting at temperatures below about 130° C. a phenol with an aldehyde under substantially anhydrous conditions in liquid phase in the presence of a metal ion as the catalyst. The preferred metal ion is a divalent ion of the transition elements of the Periodic Table, such as zinc, cadmium, manganese, copper, tin, magnesium, cobalt, lead, calcium and barium. The catalysts are salts of such metal ions and monocarboxylic acids. Examples of suitable catalyst are lead neodecanoate, zinc neodecanoate, lead naphthenate, zinc napthenate, calcium naphthenate, stannous octoate, and zinc lactate. The concentration of catalyst can vary from 0.001 to 10% by weight of the reagents and, preferably, is in the range of b 0.1 to 5%.

A preferred phenolic resin containing benzylic ether linkages of the type described hereinbefore can be prepared in accord with the process disclosed in Canadian Pat. No. 927,041, the disclosure of which is incorporated herein by reference, and by modifications of this process. The preferred process is conducted by reacting phenols and aldehydes in a molar ratio of 1 to 3 and preferably about 1.5 to 2.2 moles of aldehyde per mole of phenol in the presence of a catalyst comprising a salt of an organic monocarboxylic acid with a metal of the group of transition elements of the Periodic Table, such as disclosed hereinabove. The process is conducted to favor the production of liquid resins for suitable use in the hot oil process of the invention. The resins are prepared using sufficient water during the process so that sufficient catalyst can be removed from the reaction product when the liquid layer is decanted from the reaction product to provide a viscosity stable product. The reaction product is thereafter dehydrated to reduce the water content of the product to below about 5 weight percent. This improved benzylic ether resin is also disclosed in co-pending application Ser. No. 58,898 filed on even date herewith, the disclosure of which is incorporated herein by reference.

Other benzyl ether resins can be prepared in accordance with the disclosure of U.S. Pat. No. 4,036,816, U.S. Pat. No. 4,045,411, and U.S. Pat. No. 4,120,847, the disclosures of which are incorporated herein by reference.

The phenols used to make the benzylic ether resins are generally those phenols such as disclosed hereinabove. It is generally preferred that the phenols not be substituted at the two ortho-positions. Any one, all, or none of the remaining carbon atoms of the phenol ring can be substituted. The nature of the substituent can vary widely and it is only necessary that the substituent not interfere in the polymerization of the aldehyde with the phenol at the ortho- position. The preferred phenols are those which are unsubstituted in the para- position as well as in the ortho-position, since the availability of the para- position for subsequent cross-linking reaction is necessary for high reactivity. The most preferred phenol is the unsubstituted phenol.

The aldehydes employed in the process for making the benzylic ether phenolic resins are generally those disclosed hereinabove for preparation of phenolic resins. The most preferred aldehyde is formaldehyde.

The ratio of aldehyde to phenol employed in the process to produce the benzylic ether phenolic resins should be at least one and, preferably, is in the range of 1.5:1 to 3:1. The process is carried out in the liquid phase and may be conducted in the presence of an inert diluent, although one is not necessary.

Other useful phenolic resins include resins such as the glycol modified resole resins disclosed in British Pat. No. 1,363,227, the disclosure of which is incorporated herein by reference. The resinous compositions of this patent comprise a phenol-aldehyde resole condensation product, a glycol and an acid catalyst. The phenol-aldehyde condensation product has a ratio of aldehyde to phenol of about 1.1 to 2.5:1, the glycol is present in an amount of about 12 to 35% by weight based on weight of the phenol-aldehyde condensation product. The phenol and aldehyde can be any of those disclosed hereinabove, while the glycol is typically an alkylene glycol.

As specific examples there may be mentioned ethylene glycol, diethylene glycol, triethylene glycol, monopropylene glycol, dipropylene glycol, tripropylene glycol, butylene glycol, polyethylene glycols, polypropylene glycols, glycol derivatives such as monoglyceryl cresyl ether and substituted polypropylene glycols. Especially suitable glycols are those which have the hydroxyl groups spaced along the carbon chain and not attached to adjacent carbon atoms. A particularly preferred glycol is di-propylene glycol.

THE PROCESS OF THE INVENTION

In the preferred process of the invention, the liquid phenolic resin is dispersed in a body of a paraffinic oil having a viscosity of at least about 1000 SUS at 100° F. Such oils are typically referred to as process oils. Generally preferred are the paraffinic types having high viscosities. In some applications it may be possible to use such process oils having lower viscosities, but it has generally been found that in commercial scale equipment, it is preferred to use an oil having a viscosity of at least 1000 SUS at 100° F., even more preferably about 1500 SUS at 100° F. Process oils having viscosities of as high as 2500 or 3000 SUS at 100° F. can also be employed. The oils suitable for use in the process of the invention are generally highly refined, premium quality oils designed for a wide variety of process applications. Structurally, they have a predominance of saturated rings and long paraffinic side chains.

The oil temperature is generally maintained in the range of about 100° to 175° C. and preferably in the range of about 115° to 150° C. The time for reaction varies depending on the temperature. Thus, in a given reactor configuration, when the operating temperature is about 135° C., the time for curing of the resin is about 3 hours. Higher temperatures favor shorter reaction times and visa versa.

When the curing of the friction particles is complete in the hot oil bath, the temperature of the oil can be cooled somewhat to about 90° to 100° C. or lower. Mixing is continued throughout the reaction and cooling steps of the process. The oil containing the friction particles is passed through a phase separation zone such as a centrifuge or filter. The resulting centrifuged or filtered product is preferably washed with a lighter oil such as mineral spirits and/or lacolene to remove the more viscous oil from the surface of the particles. The washed product can be dried to provide the final friction particle.

In another aspect of the invention, friction particles can be prepared from the preferred phenolic resins of the invention containing benzylic ether linkages by heating such resins at a temperature from about 100° to about 200° C. until the resin is insoluble and infusible and, has substantially no cohesive or bonding action or strength. The product preferably does not soften under mechanical force, such as a spatula, at temperatures below about 200° C. The crude material resulting from heating of the resin is initially in lump form, and is then ground to the size specification of the customer.

The friction particle of this invention may be used alone or with other friction materials known in the art. A typical friction element contains about 30 to 60 weight percent asbestos fiber, up to 40 weight percent other inorganic filler and abrasives, about 5 to 15 weight percent organic filler, including the particle of this invention, and about 15 to 30 weight percent binder; all percents are by weight of total composition. Asbestos fiber, other abrasive materials and filler materials are charged into a mixer followed by the addition of a liquid or solid binder. The materials are kneaded until the fiber, abrasives, and any fillers are thoroughly wetted (in the case of a liquid binder) and a uniform mass is obtained. The mass is discharged from the mixer, rolled out into sheets or extruded or pressure molded and dried, after which it is ready for further processing into friction elements.

The abrasives, that is, the friction imparting agents and fillers, which may be used in addition to the abrasive material disclosed and claimed herein, within the scope of this invention include, but are not limited to brass chips, metal shavings and filings, silica, talc, wood flour, chalk, clay, mica, fiber glass, felt, carbon black, graphite, metal nitrides and oxides, and ground cashew nut shell oil polymerizate. These abrasives and fillers may be used in addition to the friction particle of this invention to achieve the particular amount of bulk and coefficient of friction desired. The particles of the invention generally have a particle size in the range of about 20 to 100 mesh. Some consumer specifications specify that the friction particle should be 90 percent finer than 20 mesh and coarser than 100 mesh. Other consumer specifications call for coarser or finer friction particles.

The following examples are given to further illustrate the inventio. Unless otherwise indicated throughout this specification and claims, all parts are by weight and temperatures in degrees centrigrade.

EXAMPLE 1

A phenolic resin containing benzylic ether linkages was prepared as follows. 675 parts of phenol, 645 parts of 50 weight percent aqueous formaldehyde, 75 parts of water and 25 parts of zinc acetate dihydrate were charged into a reaction vessel, heated to 68° C. and held for one hour at 68° to 72° C. The reaction mixture was heated to reflux and held until there was about 3% free formaldehyde in the water layer. Thereafter the reaction mixture was cooled to 60° C., the agitator was stopped and the resin was allowed to settle to the bottom of the reactor. The water layer was decanted from the reactor and the reaction product was dehydrated under full vacuum until the product achieved a refractive index in the range of 1.5875 to 1.590. The resulting resin product had the properties shown in Table 1.

TABLE 1

| Example No. | 1 | 2 | 3 |
| --- | --- | --- | --- |
| Cure Speed at 165° C., seconds | 132–137 | 67–72 | 65–70 |
| Free formaldehyde, wt. percent | 2.2 | 2.1 | 1.66 |
| Water, wt. percent | 4.0 | 5.7 | 4.4 |
| Free phenol, wt. percent | 11.09 | 4.49 | 8.34 |
| Viscosity at 25° C., centipoise | 12,400 | 118,400 | 100,800 |
| Refractive Index | 1.5892 | 1.5942 | 1.5945 |
| Solids, wt. percent | 80.3 | 84.1 | 86 |
| pH | 5.85 | 5.9 | 6.1 |
| Ash, wt. percent | None | 0.87 | 0.47 |

EXAMPLE 2

The procedure of Example 1 was repeated except that the initial charge of raw materials omitted the 75 parts of water. Otherwise the process was carried out substantially as in Example 1. The resulting product had the properties shown in Table 1.

EXAMPLE 3

The process and procedure of Example 1 was repeated except that the charge of materials was 135 parts of phenol, 129 parts of 50 weight percent aqueous formaldehyde and 5 parts of zinc acetate dihydrate. The resulting product had the properties shown in Table 1.

EXAMPLE 4

A friction particle of the invention was prepared as follows. 660 parts of a paraffinic oil having a viscosity of about 1500 SUS at 100° F. and designated by the tradename Sunpar 2150, by the Sun Oil Company was place in a vessel and heated to 80° C. Thereafter 330 parts of liquid phenolic resin prepared in Example 1 at room temperature was slowly poured over a 15 to 20 minute period into the heated oil. Heating was continued until the oil bath reached a temperature of 118° C., which temperature was held for 30 minutes. Then heating was continued until the temperature of 125° C. was achieved and held for 30 minutes, after which heating was continued to a temperature of 130° to 135° C. which temperature range was held for two hours. The vessel was agitated all during the heating process and during subsequent cooling. The oil and resin particles were passed through a centrifuge which was operated for 1 hour. Thereafter the resin particles were washed first with 260 parts of mineral spirits and thereafter with 235 parts of lacolene. The friction particles were dried in a tray dryer. 266 parts of friction particles were produced. The particles were tested and found to give the following screen analysis:

| RETAINED ON | WEIGHT PERCENT |
| --- | --- |
| 20 mesh | 0 |
| 40 mesh | 66.4 |
| 60 mesh | 28.4 |
| 80 mesh | 3.1 |
| 100 mesh | 1.0 |
| Through 100 mesh | 1.1 |

The heat stability of the above-described friction particles and commercial cashew nut friction particles was measured by thermal gravimetric analysis. The test was conducted in atmospheric air at a heating rate of 10° C. per minute. The particles of the invention showed considerably greater heat stability as shown by the following weight loss data:

| TEMPERATURE, °C. | WEIGHT LOSS, WT. PERCENT | |
|---|---|---|
| | CASHEW NUT | EXAMPLE 4 |
| 100 | 0.5 | 0 |
| 200 | 4.6 | 3.1 |
| 300 | 15.3 | 5.7 |
| 400 | 39.8 | 10.5 |
| 500 | 96.9 | 20.3 |
| 600 | 98.5 | 60.4 |

EXAMPLE 5

A friction particle of the invention was prepared as follows using a liquid phenolic resole resin prepared by reacting 100 parts of phenol and 13 parts of cresol isomers with 81.5 parts of 50 weight percent aqueous formaldehyde and 2.73 parts of hexamethylene tetramine in the presence of a NaOH catalyst. The resin had a specific gravity of 1.225–1.235 and a solids content of 81–85 weight percent. 1000 parts of a paraffinic oil having a viscosity of about 1500 SUS at 100° F. and designated by the tradename Sunpar 2150 was placed in a vessel and heated to 80° C. Thereafter, while agitating the heated oil, 500 parts of the liquid phenolic resole resin at room temperature was slowly poured into the heated oil. Heating was continued until the oil bath reached the temperature of 118° C., and this temperature was held for about 30 minutes. The heating was continued until the temperature of 140° C. was achieved, and this temperature was held for about 3 hours. The reaction mixture was agitated during the entire heating process. The reaction product was filtered to recover the cured resin particles which had formed. Thereafter, the resin particles were washed with mineral spirits and the particles were filtered from the mineral spirits. Then the particles were washed with lacolene and the particles were filtered from the lacolene. Vacuum was applied to the particles overnight. 370 parts of friction particles were produced.

EXAMPLE 6

A glycol modified resole resin was prepared as follows. 6.22 parts of phenol were charged to an agitated reactor provided with a nitrogen blanket. 10.73 parts of 37% aqueous formaldehyde were added. Then 22.8 parts of sodium hydroxide dissolved in 100 parts of water were added slowly over a 15 minute period with the reactor temperature at 52° C. The temperature was raised to 80° C. over an hour and held at that temperature for 3 hours until the formaldehyde content had decreased to 4 percent. A partial vacuum was applied and distillation commenced. As the reactor temperature decreased, the pressure was decreased until the temperature reached 50° C. The temperature of the water bath was increased to 80° C. and distillation was continued at a pressure of 40–60 mm. until a total of 6.88 parts of aqueous distillate had collected in the overhead receiver and the water content of the resin was less than 40%. The pH of the resin was adjusted to 5.5±0.2 as follows. First, 19.5 parts of concentrated sulfuric acid were added to an equivalent amount of water and the resulting solution was dissolved in 2.37 parts of dipropylene glycol. Then the glycol solution was added to the reaction mixture over a 15 minute period to complete the preparation of the glycol modified resin.

A friction particle of the invention was prepared as follows. 1000 parts of a paraffinic oil having a viscosity of about 1500 SUS at 100° F. designated by the tradename Sunpar 2150 was placed in a vessel and heated to 80° C. Thereafter, while agitating the heated oil, 500 parts of the above-described glycol modified liquid phenolic resin was slowly poured into the heated oil. Heating was continued until the oil bath reached the temperature of 118° C., and this temperature was held for 30 minutes. Then heating was continued until the temperature of 130° C. was achieved, and this temperature was held for 2 hours. The vessel was agitated all during the heating process. The resulting resin particles were filtered from the heated oil. Then, the resin particles were washed with mineral spirits and filtered from the mineral spirits. Thereafter, the particles were washed with lacolene and then filtered from the lacolene. 340 parts of friction particles were produced.

EXAMPLE 7

A friction element useful as a brake lining is prepared using the friction particles of the invention as follows. 75 parts of asbestos, 3 parts of graphite, 30 parts of barytes, 30 parts of a phenol formaldehyde resole resin and 12 parts of the friction particle of Example 4 are mixed together thoroughly. Then 56 parts of the brake lining material are placed in a compression mold which has been preheated to 100° C. The mold is placed in a press which has been preheated to 100° C. The press is closed for 1 minute, then opened and then closed rapidly to allow formed gases to escape. This procedure is repeated at 2 and 3 minute intervals. After 15 minutes the closed press is cooled for 30 minutes, opened and the molded friction element is removed from the press.

While this invention has been described with respect to certain specific embodiments, they are not intended to limit the scope of the invention, but rather to illustrate the invention.

We claim:

1. A process for producing a friction particle comprising dispersing a liquid, heat curable phenolic resin in a paraffinic oil having a viscosity of at least about 1,000 SUS at 100° F. at a temperature of about 100° to about 175° C.

2. A process for producing a friction particle comprising dispersing a liquid, heat curable phenolic resin in a paraffinic oil having a viscosity of at least about 1,000 SUS at 100° F. at a temperature of about 100° to about 175° C., wherein said phenolic resin contains benzylic ether linkages.

3. The process of claim 2 wherein the phenolic resin contains the structure:

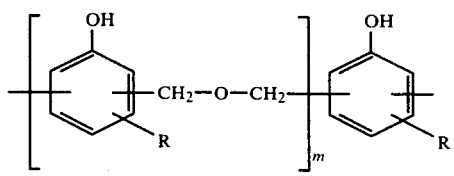

wherein m is an integer, and R is hydrogen, a hydrocarbon radical, oxyhydrocarbon radical or halogen, meta to the hydroxyl group of the phenyl group.

4. The process of claim 2 wherein the phenolic resin contains the structure:

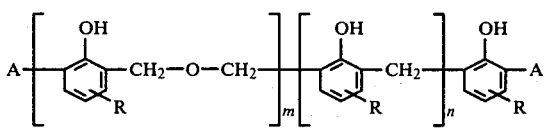

wherein R is hydrogen, a hydrocarbon radical, oxyhydrocarbon radical or halogen, meta to the hydroxyl group of the phenol group; m and n are numbers the sum of which is at least two and the ratio of m-to-n is at least one; and A is hydrogen, a methylol group, or —CH$_2$(OCH$_2$)$_x$OH, where x is an integer.

5. A process for producing a friction particle comprising dispersing a liquid, heat curable phenolic resin in a paraffinic oil having a viscosity of at least about 1,000 SUS at 100° F. at a temperature of about 100° to about 175° C., wherein said phenolic resin is a glycol modified resole resin.

6. A process for producing a friction particle comprising dispersing a liquid, heat curable phenolic resin in a paraffinic oil having a viscosity of at least about 1,000 SUS at 100° F. at a temperature of about 100° to about 175° C., wherein said phenolic resin is the condensation product of phenol and an aldehyde.

7. A friction particle produced by dispersing a liquid, heat curable phenolic resin in a paraffinic oil having a viscosity of at least about 1,000 SUS at 100° F. at a temperature of about 100° to about 175° C.

8. A friction particle produced by dispersing a liquid, heat curable phenolic resin in a paraffinic oil having a viscosity of at least about 1,000 SUS at 100° F. at a temperature of about 100° to about 175° C., wherein said phenolic resin contains benzylic ether linkages.

9. The friction particle of claim 8 wherein the phenolic resin contains the structure:

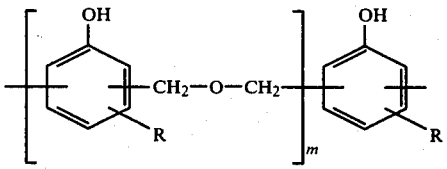

where m is an integer, and R is hydrogen, a hydrocarbon radical, oxyhydrocarbon radical or halogen, meta to the hydroxyl group of the phenyl group.

10. The friction particle of claim 8 wherein the phenolic resin contains the structure:

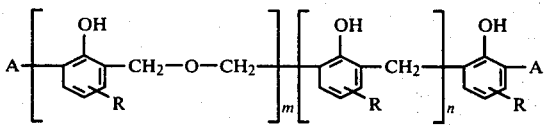

wherein R is hydrogen, a hydrocarbon radical, oxyhydrocarbon radical or halogen, meta to the hydroxyl group of the phenyl group; m and n are numbers the sum of which is at least two and the ratio of m-to-n is at least one; and A is hydrogen, a methylol group, or —CH$_2$(OCH$_2$)$_x$OH, where x is an integer.

11. A friction particle produced by dispersing a liquid, heat curable phenolic resin in a paraffinic oil having a viscosity of at least about 1,000 SUS at 100° F. at a temperature of about 100° to about 175° C., wherein said phenolic resin is a glycol-modified resole resin.

12. A friction particle comprising the product of the reaction at about 100° to about 175° C. of a phenolic resin containing benzylic ether linkages until the product is substantially insoluble in acetone, infusible, and has substantially no cohesive or bonding strength.

13. The friction particle of claim 12 wherein the phenolic resin contains the structure:

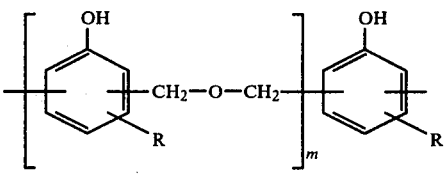

where m is an integer, and R is hydrogen, a hydrocarbon radical, oxyhydrocarbon radical or halogen, meta to the hydroxyl group of the phenyl group.

14. A friction particle of claim 12 wherein the phenolic resin contains the structure:

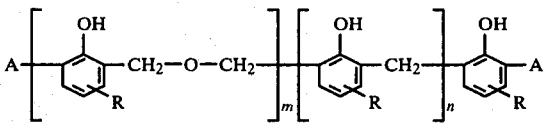

wherein R is hydrogen, a hydrocarbon radical, oxyhydrocarbon radical or halogen, meta to the hydroxyl group of the phenol group; m and n are numbers the sum of which is at least two and the ratio of m-to-n is at least one; and A is hydrogen, a methylol group or —CH$_2$(OCH$_2$)$_x$OH, where x is an integer.

15. A friction particle comprising the product of the reaction at about 100° to about 175° C. of a glycol-modified resole phenolic resin until the product is substantially insoluble in acetone, infusible, and has substantially no cohesive or bonding strength.

16. A friction particle produced by dispersing a liquid, heat curable phenolic resin in a paraffinic oil having a viscosity of at least about 1,000 SUS at 100° F. at a temperature of about 100° to about 175° C., wherein said phenolic resin is the condensation product of phenol and an aldehyde.

17. A friction element comprising the friction particle of claims 7, 12, or 15, and a binder composition.

18. A friction element comprising the friction particle of claims 9, 13 or 15, a resin binder and a filler material.

19. A brake lining comprising about 5 to 15 weight percent of the friction particle of claims 10, 14 or 15, about 15 to 30 weight percent of resin binder and about 55 to 80 weight percent of filler materials.

* * * * *